(12) United States Patent
Sun

(10) Patent No.: US 11,537,547 B2
(45) Date of Patent: Dec. 27, 2022

(54) SLAVE DEVICE, MASTER DEVICE, AND DATA TRANSMISSION METHOD

(71) Applicant: Nuvoton Technology Corporation, Hsinchu Science Park (TW)

(72) Inventor: Chi-Yung Sun, Hsinchu (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 17/174,573

(22) Filed: Feb. 12, 2021

(65) Prior Publication Data

US 2021/0294770 A1  Sep. 23, 2021

(30) Foreign Application Priority Data

Mar. 20, 2020 (TW) .................................. 109109326

(51) Int. Cl.
*G06F 13/42* (2006.01)
*G06F 13/40* (2006.01)
*G06F 1/06* (2006.01)

(52) U.S. Cl.
CPC ............ *G06F 13/4068* (2013.01); *G06F 1/06* (2013.01); *G06F 13/4291* (2013.01)

(58) Field of Classification Search
CPC ........ G06F 13/00; G06F 13/4068; G06F 1/06; G06F 13/4291
See application file for complete search history.

(56) References Cited

U.S. PATENT DOCUMENTS

| | | | |
|---|---|---|---|
| 10,152,320 B2 | 12/2018 | Vorbach et al. | |
| 10,373,181 B2* | 8/2019 | Boinodiris | G06Q 30/0205 |
| 10,496,667 B2 | 12/2019 | Rath et al. | |
| 2012/0083902 A1* | 4/2012 | Daum | H04B 3/548 700/3 |
| 2012/0272088 A1* | 10/2012 | Lee | G06F 1/3253 713/501 |
| 2017/0156153 A1* | 6/2017 | Hart | H04L 45/72 |
| 2017/0180206 A1* | 6/2017 | Ahmed | G06F 15/80 |
| 2019/0279326 A1* | 9/2019 | Chen | H04L 9/30 |
| 2019/0319670 A1 | 10/2019 | Kearney et al. | |
| 2019/0379725 A1 | 12/2019 | Wada et al. | |
| 2020/0021864 A1* | 1/2020 | Weitendorf | G07F 17/42 |

FOREIGN PATENT DOCUMENTS

| | | |
|---|---|---|
| CN | 102124454 A | 7/2011 |
| JP | 2014-230097 A | 12/2014 |
| TW | 200423637 A | 11/2004 |
| TW | I299450 B | 8/2008 |
| TW | I646543 B | 1/2019 |

* cited by examiner

*Primary Examiner* — Henry Tsai
*Assistant Examiner* — Kim T Huynh
(74) *Attorney, Agent, or Firm* — Muncy, Geissler, Olds & Lowe, P.C.

(57) ABSTRACT

A slave device coupled to a master device via a bus and including a serial interface, a code generator circuit, and a control circuit is provided. The serial interface is configured to be coupled to the bus. The code generator circuit is configured to generate a unique code. The control circuit is coupled between the serial interface and the code generator circuit. In a set mode, the control circuit triggers the code generator circuit to generate the unique code. In an operation mode, the control circuit determines whether to perform commands provided by the master device according to the unique code.

23 Claims, 10 Drawing Sheets

SLAVE DEVICE, MASTER DEVICE, AND DATA TRANSMISSION METHOD

CROSS REFERENCE TO RELATED APPLICATIONS

This application claims priority of Taiwan Patent Application No. 109109326, filed on Mar. 20, 2020, the entirety of which is incorporated by reference herein.

BACKGROUND OF THE INVENTION

Field of the Invention

The invention is related to a slave device, and more particularly to a slave device that generates its own identification code.

Description of the Related Art

With technological development, the types and functions of electronic devices have increased. Generally, each electronic device has many electronic elements. These electronic elements may be controlled by a master device. To identify the electronic elements, the manufacturer of each electronic element first stores an identification code in the electronic element. The master device controls many electronic elements according to these identification codes. However, when different electronic elements have the same identification code, the master device cannot control the corresponding electronic elements normally.

BRIEF SUMMARY OF THE INVENTION

In accordance with an embodiment of the disclosure, a master device is coupled to a plurality of slave devices via a bus and comprises a serial interface and a control circuit. The serial interface is configured to be coupled to the bus. The control circuit controls the slave devices via the serial interface. In a set mode, the control circuit directs each of the slave devices to generate a unique code via the serial interface. In a scanning mode, the control circuit scans the slave devices to obtain the unique codes of the slave devices via the serial interface.

A data transmission method for a master device of a master-slave system is provided. The master-slave system comprises a plurality of slave devices. The data transmission method comprises: directing each of the slave devices to generate a unique code; scanning the slave devices to obtain the unique codes of each of the slave devices; and assigning commands to each of the slave devices according to the unique codes of the slave devices.

In accordance with another embodiment of the disclosure, a slave device is coupled to a master device via a bus and comprises a serial interface, a code generator circuit, and a control circuit. The serial interface is configured to be coupled to the bus. The code generator circuit is configured to generate a unique code. The control circuit is coupled between the serial interface and the code generator circuit. In a set mode, the control circuit triggers the code generator circuit to generate the unique code. In an operation mode, the control circuit determines whether to perform commands provided by the master device according to the unique code.

Data transmission methods for a master-slave system comprising a master device and at least one slave device may be practiced by the master-slave system which have hardware or firmware capable of performing particular functions and may take the form of program code embodied in a tangible media. When the program code is loaded into and executed by an electronic device, a processor, a computer or a machine, the electronic device, the processor, the computer or the machine becomes the master device or the slave device for practicing the disclosed method.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1A:
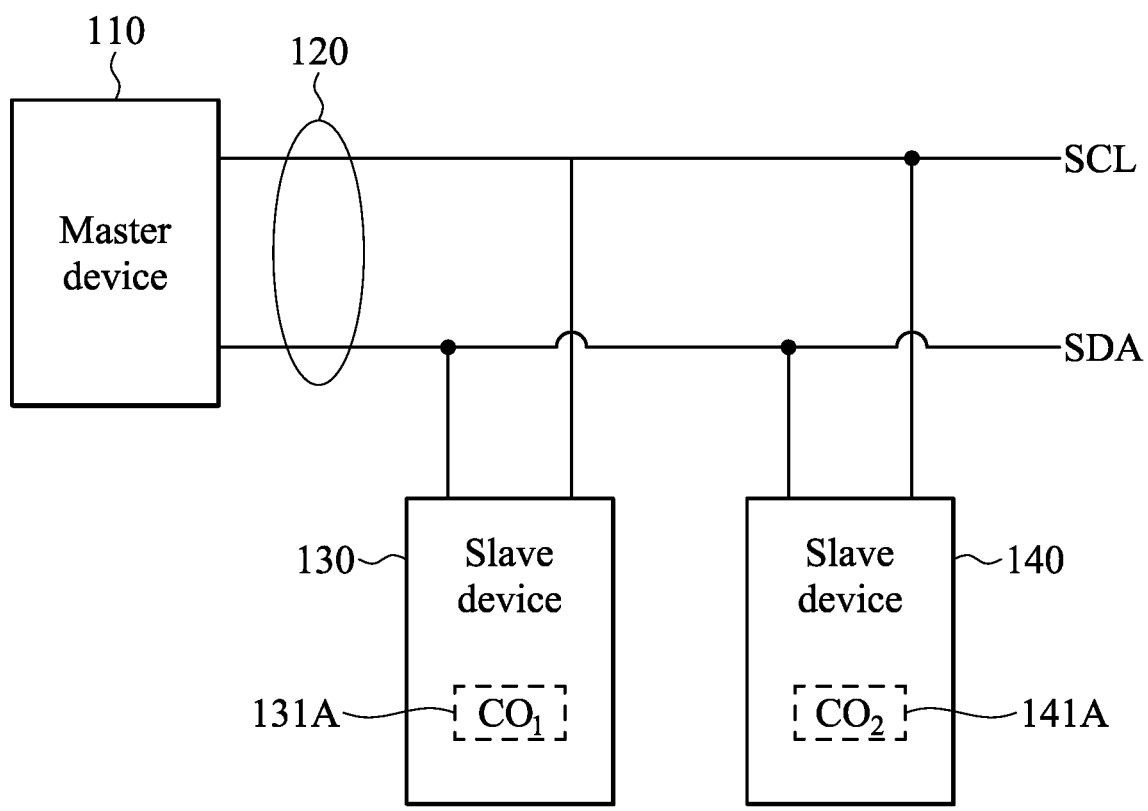
FIG. 1A is a schematic diagram of an exemplary embodiment of a master-slave system according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1A is a schematic diagram of an exemplary embodiment of a master-slave system according to various aspects of the present disclosure. As shown in FIG. 1A, the master-slave system 100A comprises a master device 110, a bus 120, slave devices 130 and 140. The master device 110 is coupled to the slave devices 130 and 140 via the bus 120. The bus 120 may transmit data by a serial method or a parallel method. In this embodiment, the bus 120 is a serial communication bus, such as an inter-integrated circuit (I2C) bus, but the disclosure is not limited thereto. In other embodiments, the bus 120 is another type of bus.

In this embodiment, the bus 120 comprises transmission lines SCL and SDA. The transmission line SCL is configured to transmit a clock signal generated by the master device 110 to the slave devices 130 and 140. The transmission line SDA is configured to transmit data generated by the master device 110 to the slave devices 130 and 140 or transmit data generated by the slave devices 130 and 140 to the master device 110.

In this embodiment, each of the slave devices 130 and 140 receives the commands on the transmission line SDA according to the clock signal on the transmission line SCL and then operates according to the commands on the transmission line SDA. Additionally, at least one of the slave devices 130 and 140 outputs response data to the transmission line SDA according to the clock signal on the transmission line SCL. In this case, the master device 110 obtains the characteristics of the slave devices 130 and 140 according to the response data on the transmission line SDA.

The kinds of slave devices 130 and 140 are not limited in the present disclosure. In one embodiment, the slave devices 130 and 140 can be any kind of electronic element, such as an analog-to-digital converter (ADC), a sensor, a digital-to-analog converter (DAC), a memory, and so on. Furthermore, the kind of slave device 130 may be the same or different from the kind of slave device 140. For example, the slave devices 130 and 140 are ADCs. In another embodiment, the slave device 130 is a pressure sensor, and the slave device 140 is a temperature sensor. The number of slave devices is not limited in the present disclosure. In other embodiments, the master-slave system 100A comprises more slave devices.

In this embodiment, each of the slave devices 130 and 140 determines whether to perform the commands provided by the master device 110 according to the value of an identification field of the commands provided by the master device 110. Taking the slave device 130 as an example, when the master device 110 outputs a specific command and the value of the identification field of the specific command matches the unique code of the slave device 130, the slave device 130 performs the specific command. However, when the value of the identification field of the specific command is not equal to the unique code of the slave device 130, the slave device 130 does not perform the specific command.

In this embodiment, each of the slave devices 130 and 140 generates the unique code by itself. In one embodiment, the slave device 130 comprises a code generator circuit 131A configured to generate a unique code $CO_1$. Additionally, the slave device 140 also comprises a code generator circuit 141A configured to generate a unique code $CO_2$. In this case, when the value of the identification field of the control command sent by the master device 110 matches the unique code $CO_1$, the slave device 130 performs the control command sent by the master device 110. At this time, the slave device 140 ignores the control command sent by the master device 110. Similarly, when the value of the identification field of the control command sent by the master device 110 matches the unique code $CO_2$, the slave device 140 performs the control command sent by the master device 110. At this time, the slave device 130 ignores the control command sent by the master device 110.

In another embodiment, the master device 110 assigns different identification codes to the slave devices 130 and 140 according to the unique codes $CO_1$ and $CO_2$. For example, the master device 110 assigns a first value (e.g., 01) to the slave device 130 according to the unique code $CO_1$, and assigns a second value (e.g., 02) to the slave device 140 according to the unique code $CO_2$. In this case, the slave device 130 determines whether to perform the control command provided by the master device 110 according to the first value, and the slave device 140 determines whether to perform the control command provided by the master device 110 according to the second value. Taking the slave device 130 as an example, when the value of the identification field of the control command provided by the master device 110 matches the first value, the slave device 130 performs the control command provided by the master device 110. However, when the value of the identification field of the control command provided by the master device 110 is not equal to the first value, the slave device 130 does not perform the control command provided by the master device 110.

The structures of the code generator circuits 131A and 141A are not limited in the present disclosure. In one embodiment, the code generator circuits 131A and 141A are random number generators. In other embodiment, any circuit can serve as the code generator circuit 131A or 141A, as long as the circuit is capable of generating random number. In some embodiment, the structure of code generator circuit 131A is the same as or different from the structure of code generator circuit 141A.

Figure 1B:
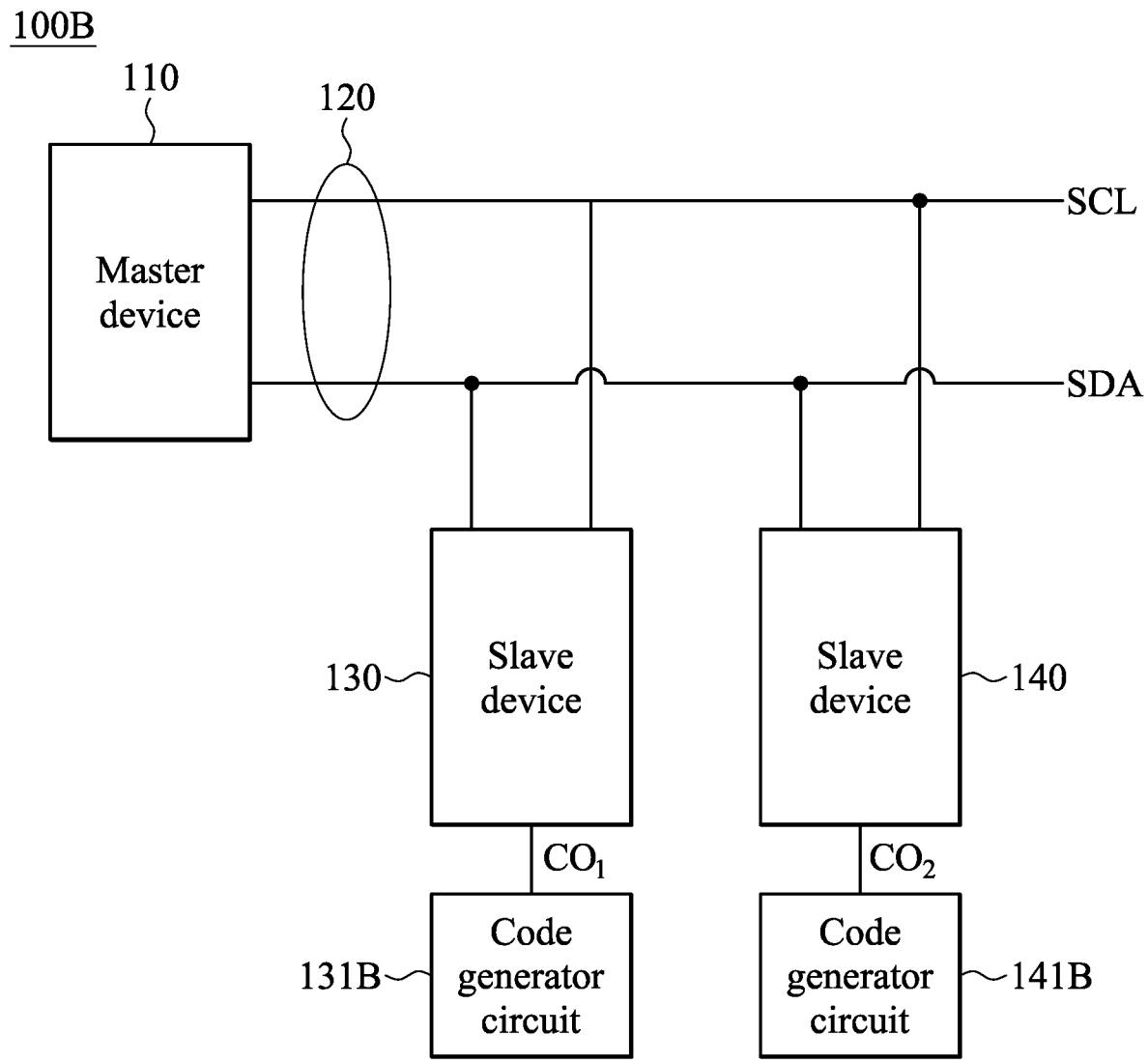
FIG. 1B is a schematic diagram of another exemplary embodiment of the master-slave system according to various aspects of the present disclosure.

In FIG. 1A, the code generator circuit 131A is integrated into the slave device 130, and the code generator circuit 141A is integrated into the slave device 140, but the disclosure is not limited thereto. In FIG. 1B, the code generator circuits 131A and 141A are independent of the slave devices 130 and 140. In this case, the slave device 130 receives the unique code $CO_1$ generated by the code generator circuit 131B, and the slave device 140 receives the unique code $CO_2$ generated by the code generator circuit 141B.

Figure 1C:
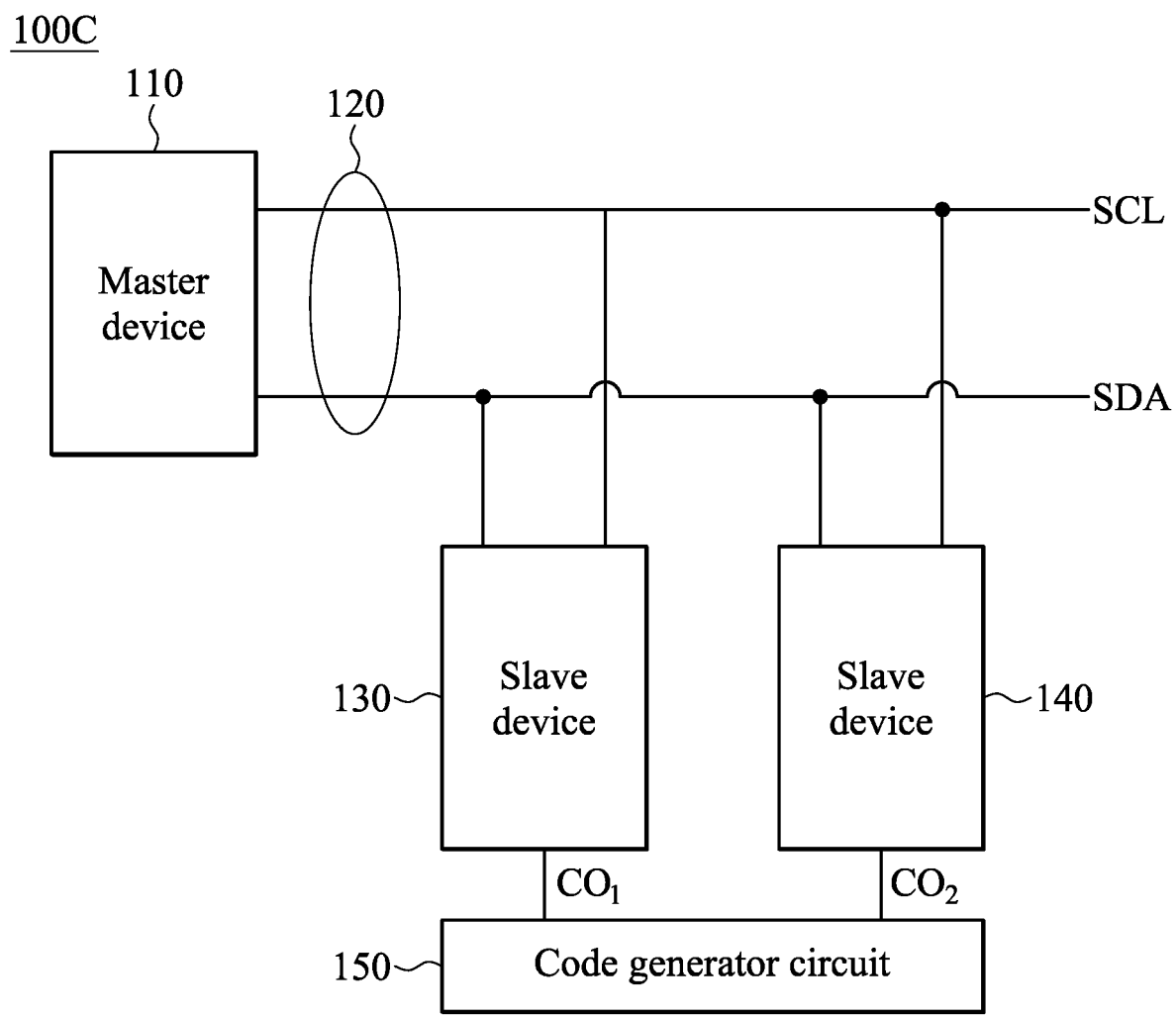
FIG. 1C is a schematic diagram of an exemplary embodiment of the master-slave system according to various aspects of the present disclosure.

In other embodiment, the unique codes of the slave devices 130 and 140 are generated by the same code generator circuit. As shown in FIG. 1C, the code generator circuit 150 generates the unique codes $CO_1$ and $CO_2$ to the slave devices 130 and 140. The unique code $CO_1$ is different from the unique code $CO_2$. In one embodiment, the code generator circuit 150 first generates a first unique code (e.g., $CO_1$) and then adjusts the first unique code. The code generator circuit 150 serves the adjusted first unique code as a second unique code (e.g., $CO_2$).

Figure 2:
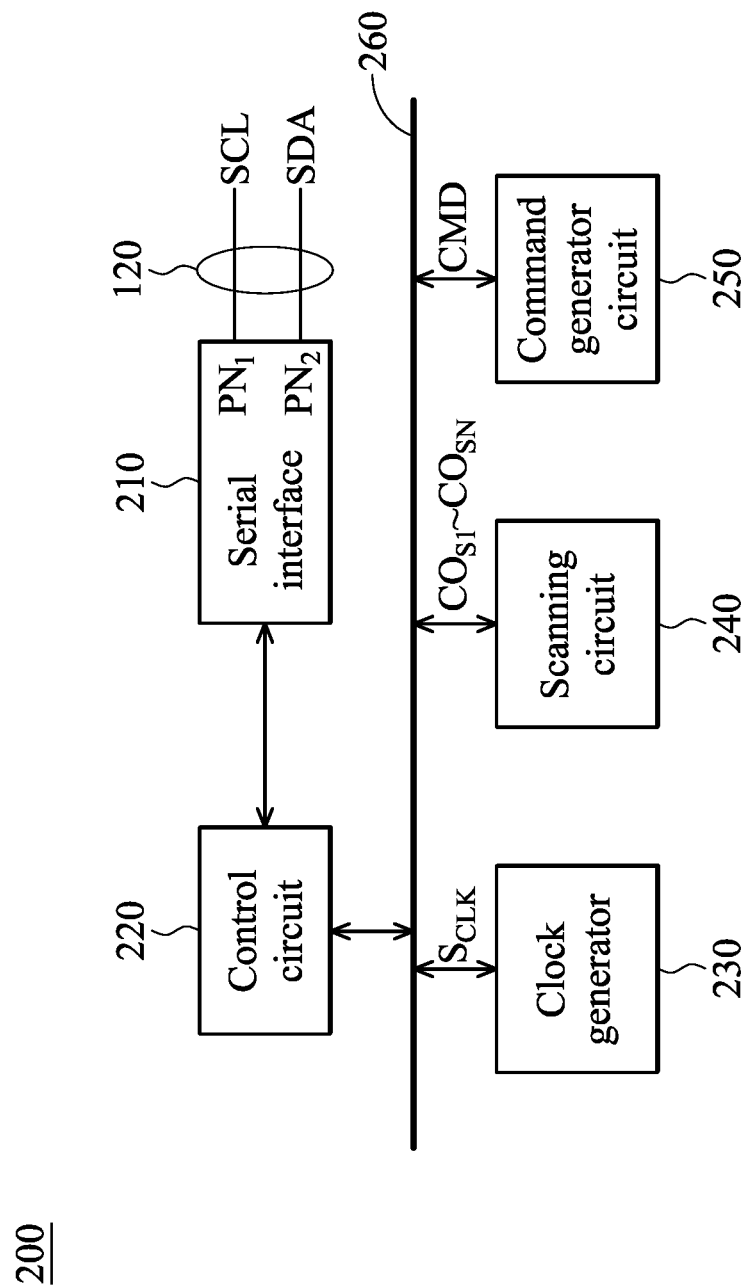
FIG. 2 is a schematic diagram of an exemplary embodiment of a master device according to various aspects of the present disclosure.

In this embodiment, the slave devices 130 and 140 are controlled by the master device 110. In a set mode, the master device 110 performs a set operation to direct the slave devices 130 and 140 to generate the unique codes $CO_1$ and $CO_2$. FIG. 2 is used to explain how the master device 110 directs the slave devices 130 and 140 to generate the unique codes $CO_1$ and $CO_2$.

Then, in a scanning mode, the master device 110 performs a scanning operation to obtain the values of the unique codes $CO_1$ and $CO_2$ of the slave devices 130 and 140. The invention does not limit how the master device 110 obtains the unique codes $CO_1$ and $CO_2$ of the slave devices 130 and 140. FIG. 2 is used to explain how the master device 110 obtains the unique codes $CO_1$ and $CO_2$ of the slave devices 130 and 140.

FIG. 2 is a schematic diagram of an exemplary embodiment of a master device according to various aspects of the present disclosure. As shown in FIG. 2, the master device 200 comprises a serial interface 210 and a control circuit 220. The serial interface 210 is configured to be coupled to the bus 120. The type of serial interface 210 is not limited in the present disclosure. In this embodiment, the serial interface 210 is a I2C interface and comprises pins $PN_1$ and $PN_2$. The pin $PN_1$ is configured to be coupled to the transmission line SCL. The pin $PN_2$ is configured to be coupled to the transmission line SDA.

The control circuit 220 is coupled to the serial interface 210 and coupled to a plurality of slave devices (e.g., 130 and 140) via the bus 120. In a set mode, the control circuit 220 directs each slave device to generate a unique code via the serial interface 210. In a scanning mode, the control circuit 220 generates a plurality of scanning codes and obtains the unique codes of the slave devices according to the scanning codes. In one embodiment, the serial interface 210 is a state machine or a micro-processor.

Additionally, the invention does not limit how the control circuit 220 directs all slave devices to generate the unique codes. In one embodiment, the master device 200 further comprises a command generator circuit 250. The command generator circuit 250 generates a control command CMD to control the corresponding slave device. For example, in the set mode, the control command CMD generated by the command generator circuit 250 is a trigger command. When the control circuit 220 outputs the trigger command via the serial interface 210, the random number generator of each of the slave devices generates a random number. In this case, the random number generated by the random number generator serves as the unique code of the corresponding slave device.

In another embodiment, the control command CMD generated by the command generator circuit 250 is a start-counting command. In this case, when the control circuit 220 outputs the start-counting command via the serial interface 210, the counter in each of the slave devices starts counting. In one embodiment, the counter in each of the slave devices performs a counting operation. At the predetermined time (e.g., 100 msec~1 sec), the command generator circuit 250 generates a stop-counting command. The control circuit 220 outputs the stop-counting command via the serial interface 210. Therefore, the counter in each of the slave devices stops counting. In one embodiment, the counter in each of the slave devices stop performing the counting operation. At this time, the final count value of the counter serves as the unique code of the corresponding slave device.

In other embodiments, the control circuit 220 further comprises a scanning circuit 240. The scanning circuit 240 is configured to generate scanning codes $CO_{S1}$~$CO_{SN}$. The control circuit 220 outputs the scanning codes $CO_{S1}$~$CO_{SN}$ to all slave devices via the serial interface 210. In this embodiment, each when the control circuit 220 outputs one scanning code, the control circuit 220 determines whether to store the scanning code according to the acknowledgments from the slave devices.

For example, when the control circuit 220 outputs the scanning code $CO_{S1}$, the slave device 130 determines whether the scanning code COs, matches the unique code $CO_1$ and the slave device 140 determines whether the scanning code COs, matches the unique code $CO_2$. If the value of the scanning code COs, matches the value of the unique code $CO_1$, the slave device 130 sends a response. In one embodiment, the slave device 130 may set the level of the transmission line SDA to a predetermined level (e.g., a low level). The control circuit 220 will recognize that the scanning code $CO_{S1}$ matches the unique code of a slave device according to the level of the transmission line SDA. Therefore, the control circuit 220 stores the scanning code $CO_{S1}$. However, if the value of the scanning code COs, is not equal to the values of the unique codes $CO_1$ and $CO_2$, the slave devices 130 and 140 do not send any response. Therefore, the level of the transmission line SDA is not equal to the predetermined level. In this time, the level of the transmission line SDA may be a high level. The control circuit 220 does not store the scanning code COs, and then outputs a next scanning code.

The sequence for which the control circuit 220 outputs the scanning codes $CO_{S1}$~$CO_{SN}$ is not limited in the present disclosure. In one embodiment, the control circuit 220 outputs the scanning codes $CO_{S1}$~$CO_{SN}$ successively or randomly. After the control circuit 220 outputs all scanning codes, the number of scanning codes stored in the control circuit 220 should be equal to the number of slave devices. However, when the number of scanning codes stored in the control circuit 220 is not equal to the number of slave devices, it means that some slave devices have the same unique code, for example, the unique code $CO_1$ is the same as the unique code $CO_2$. Therefore, the control circuit 220 performs the set operation again to direct all slave devices to generate new unique codes. In one embodiment, the control circuit 220 may wait a long time (e.g., 2 seconds) and then send the stop-counting command. Since the counting time of the counter increases, the probability that different counters generate the same count value is reduced.

When the number of scanning codes stored in the control circuit 220 is equal to the number of slave devices, it means that the control circuit 220 obtains the unique codes of all of the slave devices. Therefore, the control circuit 220 utilizes the stored scanning codes to direct the slave devices to output function data. The control circuit 220 obtains the function of each slave device corresponding to one scanning code according to the acknowledgments from the slave devices. For example, when the unique code $CO_1$ of the slave device 130 matches the scanning code $CO_{S1}$, the control circuit 220 sends an inquiry command to direct the slave device 130 to output function data. The control circuit 220 may obtain that the slave device 130 is a memory according to the function data provided by the slave device 130. In one embodiment, the control circuit 220 may utilize the scanning code $CO_{S1}$ to write data to the slave device 130 or read data stored in the slave device 130.

In other embodiments, the control circuit 220 assigns different identification codes to different slave devices according to the stored scanning codes (e.g., $CO_{S1}$ and $CO_{SN}$) to replace the unique codes $CO_1$ and $CO_2$. For example, the control circuit 220 may assign a first value (e.g., 01) to the slave device 130 and assign a second value (e.g., 02) to the slave device 140. In this case, the slave device 130 serves the first value as its identification code. When the value of the identification field of the control command CMD sent by the master device 200 matches the first value, the slave device 130 performs the control command CMD. However, when the value of the identification field of the control command CMD sent by the master device 200 is not equal to the first value, the slave device 130 does not perform the control command CMD.

In other embodiments, the master device 200 further comprises a clock generator 230. The clock generator 230 is configured to generate a clock signal $S_{CLK}$. In this case, the control circuit 220 outputs the clock signal $S_{CLK}$ to the slave devices (e.g., 130 and 140) via the pin $PN_1$ of the serial interface 210. The slave devices (e.g., 130 and 140) receives the command on the transmission line SDA according to the clock signal $S_{CLK}$.

In this embodiment, the master device 200 further comprises a bus 260. The control circuit 220 communicates with the clock generator 230, the scanning circuit 240 and the command generator circuit 250 via the bus 260. In one embodiment, the control circuit 220 generates the corresponding control signals and a timing sequence to control and communicate the clock generator 230, the scanning circuit 240 and the command generator circuit 250. The type of bus 260 is not limited in the present disclosure. The bus 260 may transmit data (e.g., $S_{CLK}$, $CO_{S1}$~$CO_{SN}$, CMD) by a serial method or a parallel method.

Figure 3A:
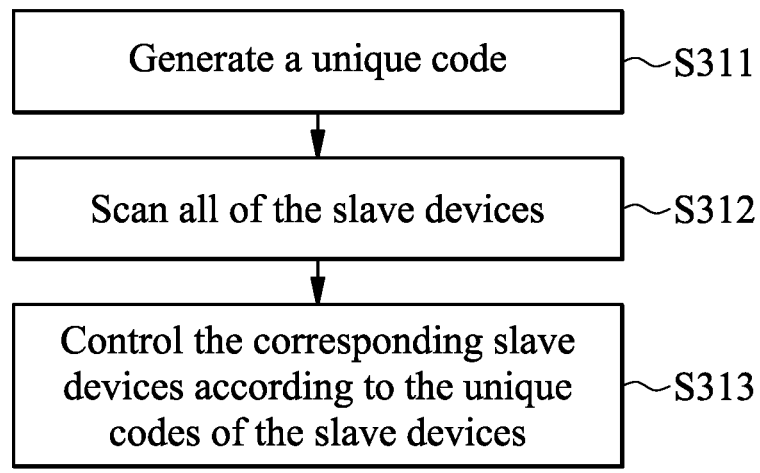
FIG. 3A is a flowchart schematic diagram of an exemplary embodiment of a data transmission method for the master device according to various aspects of the present disclosure.

FIG. 3A is a flowchart schematic diagram of an exemplary embodiment of a data transmission method for the master device according to various aspects of the present disclosure. The data transmission method can be performed by the master devices 110 of the master-slave systems 100A, 100B and 100C. First, each of the slave devices is required to generate a unique code (step S311). The invention does not limit how the master device 110 requires each slave device to generate a unique code. In one embodiment, the master device 110 sends a trigger command to trigger the random number generator of each slave device so that the random number generator will generate a random number. The random number serves as the unique code of the corresponding slave device. In another embodiment, the master device 110 sends a start-counting command to direct a counter of each slave device to start counting. After a predetermined time, the master device 110 sends a stop-counting command to direct the counter of each slave device to stop counting. At this time, the count value of each counter serves as a unique code.

Then, all of the slave devices are scanned to obtain all of the unique codes of all of the slave devices (step S312). The invention does not limit how the master device 110 scans the slave devices. In one embodiment, the master device 110 generates a plurality of scanning codes and outputs the scanning codes according to a predetermined sequence. In this case, each when the master device 110 outputs a scanning code, the master device 110 detects the acknowledgments from all slave devices to determine whether the scanning code matches the unique code of a slave device. When one slave device generates an acknowledgement, the master device 110 stores the scanning code. Therefore, the master device 110 stores some scanning codes after the master device 110 outputs all scanning codes.

In some embodiment, the number of bits of a scanning code sent by the master device 110 is less than the number of bits of the unique code of a slave device. For example, assume that the unique code of the slave device 130 has 16 bits. In this case, the scanning code sent by the master device 110 only has 10 bits. Since the slave device 130 only needs to determine whether the values of the last 10 bits of its unique code are equal to the values of the scanning code sent by the master device 110, the slave device 130 is capable of quickly generating an acknowledgement to the master device 110.

Then, the corresponding slave devices are controlled according to the unique codes of the slave devices (step S313). In one embodiment, the master device 110 directly serves the stored scanning codes as the identification codes of the slave devices 130 and 140. In this case, when the value of the identification field of the control command sent by the master device 110 matches the value of the unique code $CO_1$ of the slave device 130, the slave device 130 performs the control command sent by the master device 110. In another embodiment, the master device 110 assigns different identification codes to different slave devices according to the stored scanning codes. Assume that the master device 110 directs the slave device to store a first value (e.g., 01). The slave device 130 performs the control command sent by the master device 110.

Figure 3B:
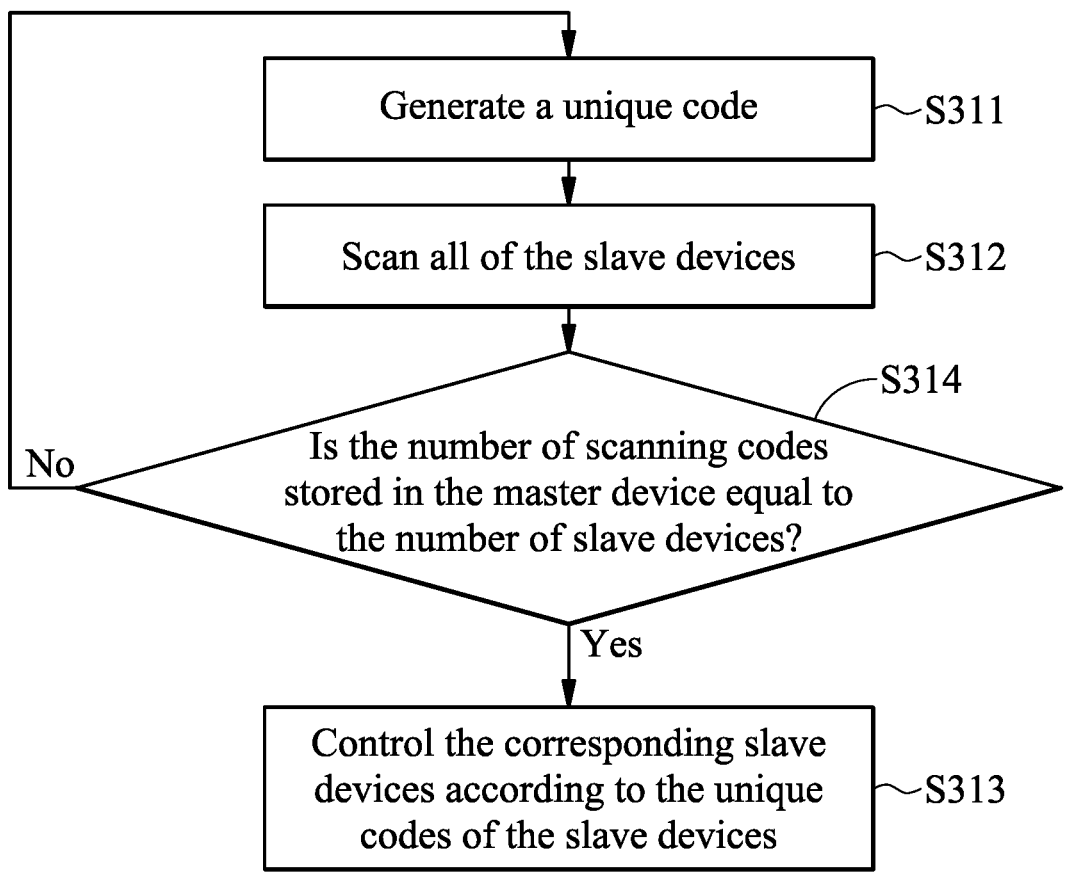
FIG. 3B is a flowchart schematic diagram of another exemplary embodiment of the data transmission method for the master device according to various aspects of the present disclosure.

FIG. 3B is a flowchart schematic diagram of another exemplary embodiment of the data transmission method for the master device according to various aspects of the present disclosure. FIG. 3B is similar to FIG. 3A except for the addition of step S314. Step S314 determines whether the number of scanning codes stored in the master device 110 is equal to the number of slave devices. When the number of scanning codes stored in the master device 110 is equal to the number of slave devices, it means that the master device 110 recognizes the unique codes of all of the slave devices. Therefore, the master device 110 performs step S313. However, when the number of scanning codes stored in the master device 110 is not equal to the number of slave devices, it means that the multiple slave devices have the same unique code. Therefore, the master device 110 performs step S311 to direct each of the slave devices to generate a new unique code.

Figure 4A:
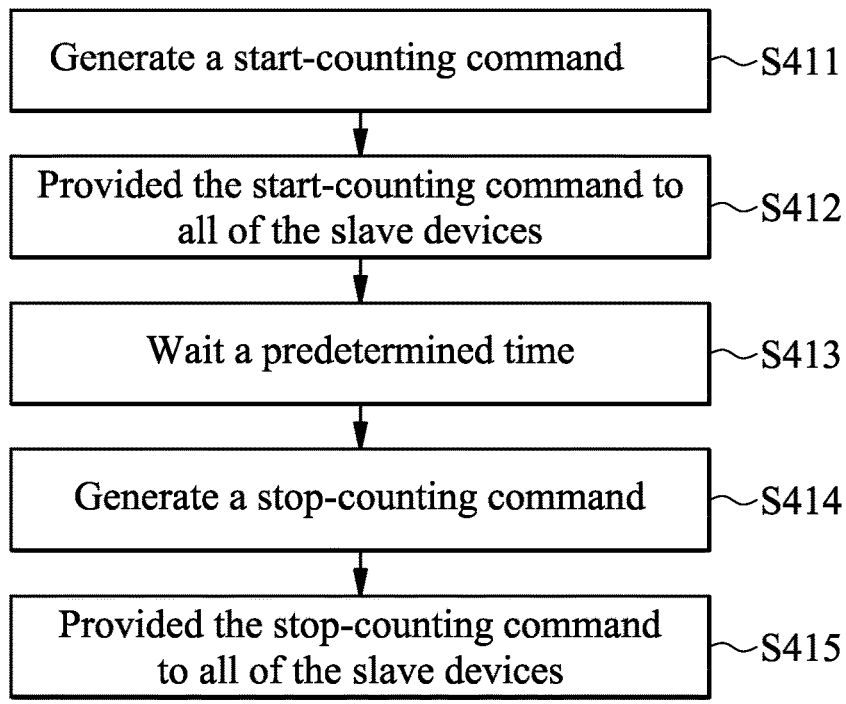
FIG. 4A is a flowchart schematic diagram of an exemplary embodiment of step S311 of FIG. 3A according to various aspects of the present disclosure.

FIG. 4A is a flowchart schematic diagram of an exemplary embodiment of step S311 of FIG. 3A according to various aspects of the present disclosure. In this embodiment, the master device 110 utilizes the control method of FIG. 4A to direct the slave devices comprising counters to generate the unique codes. First, a start-counting command is generated (step S411) and provided to all of the slave devices (step S412). After receiving the start-counting command, the counters in all of the slave devices may reset their own count values and then start to perform a counting operation. In one embodiment, the counter counts the number of pulses generated by an oscillation circuit.

Then, the master device waits a predetermined time (step S413). In one embodiment, the master device 110 dynamically adjusts the predetermined time. For example, the length of the predetermined time relates with the number of times the counter performs the counting operation. With increase of the number of times the counter performs the counting operation, the length of the predetermined time is increased. The length of the predetermined time is not limited in the present disclosure. In one embodiment, the original length of the predetermined time is approximately 100 ms to 1 second. When the counter performs the counting operation again, the length of the predetermined time may be 2 seconds to 3 seconds.

Then, a stop-counting command is generated (step S414) and provided to all slave devices (step S415). In one embodiment, after receiving the stop-counting command, the counters in all of the slave devices stop performing the counting operation. At this time, the count value of the counter of each slave device serves as the unique code of the corresponding slave device.

In other embodiments, when the master device finds that the number of scanning codes stored in the master device is different from the number of slave devices, it means that some slave devices have the same unique code. Therefore, the master device executes step S411 to send the start-counting command again so that the counters in all of the slave devices start counting again. In this case, the master device increases or reduces the length of the predetermined time of step S413.

In some embodiment, before executing step S411, the master device generates a clock signal and provides the clock signal to all slave devices. At this time, all slave devices receive the command provided by the master device (e.g., 110) according to the clock signal.

Figure 4B:
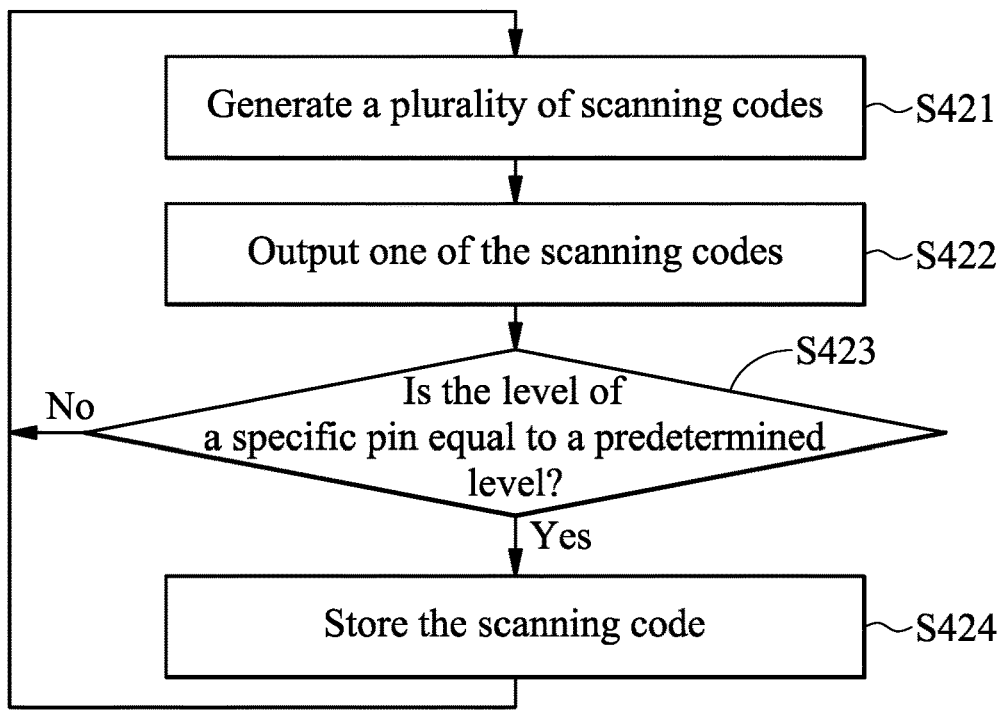
FIG. 4B is a flowchart schematic diagram of an exemplary embodiment of step S312 of FIG. 3A according to various aspects of the present disclosure.

FIG. 4B is a flowchart schematic diagram of an exemplary embodiment of step S312 of FIG. 3A according to various aspects of the present disclosure. First a plurality of scanning codes are generated (step S421) and one of the scanning codes is output to all slave devices (step S422). The invention does not limit the sequence of outputting the scanning codes. In one embodiment, the scanning codes are output from small to large or from large to small. In other embodiment, the master device (e.g., 110) selects one of the scanning codes according to a random method and outputs the selected scanning code.

After outputting a scanning codes, a determination is made as to whether the level of a specific pin is equal to a predetermined level (step S423). In this embodiment, the specific pin is configured to output the scanning codes. In one embodiment, the master device 110 outputs the scanning codes via a specific pin of a serial interface. In this case, when each of the slave devices receives one scanning code, each of the slave devices determines whether the scanning code matches its unique code. If the scanning code matches the unique code, the corresponding slave device sets the level of the specific pin to a predetermined level, such as a low level. If the scanning code is not equal to the unique code, the corresponding slave device does not set the level of the specific pin. At this time, the level of the specific pin may be a high level. Therefore, it is obtained whether the scanning code output from the master device matches the unique code of one of the slave devices according to the level of the specific pin.

When the level of the specific pin is equal to the predetermined level, the scanning code just output is stored (step S424) and step S421 is executed to output another scanning code to each slave device. However, when the level of the specific pin is not equal to the predetermined level, step S421 is executed to output another scanning code to all slave devices.

Figure 5A:
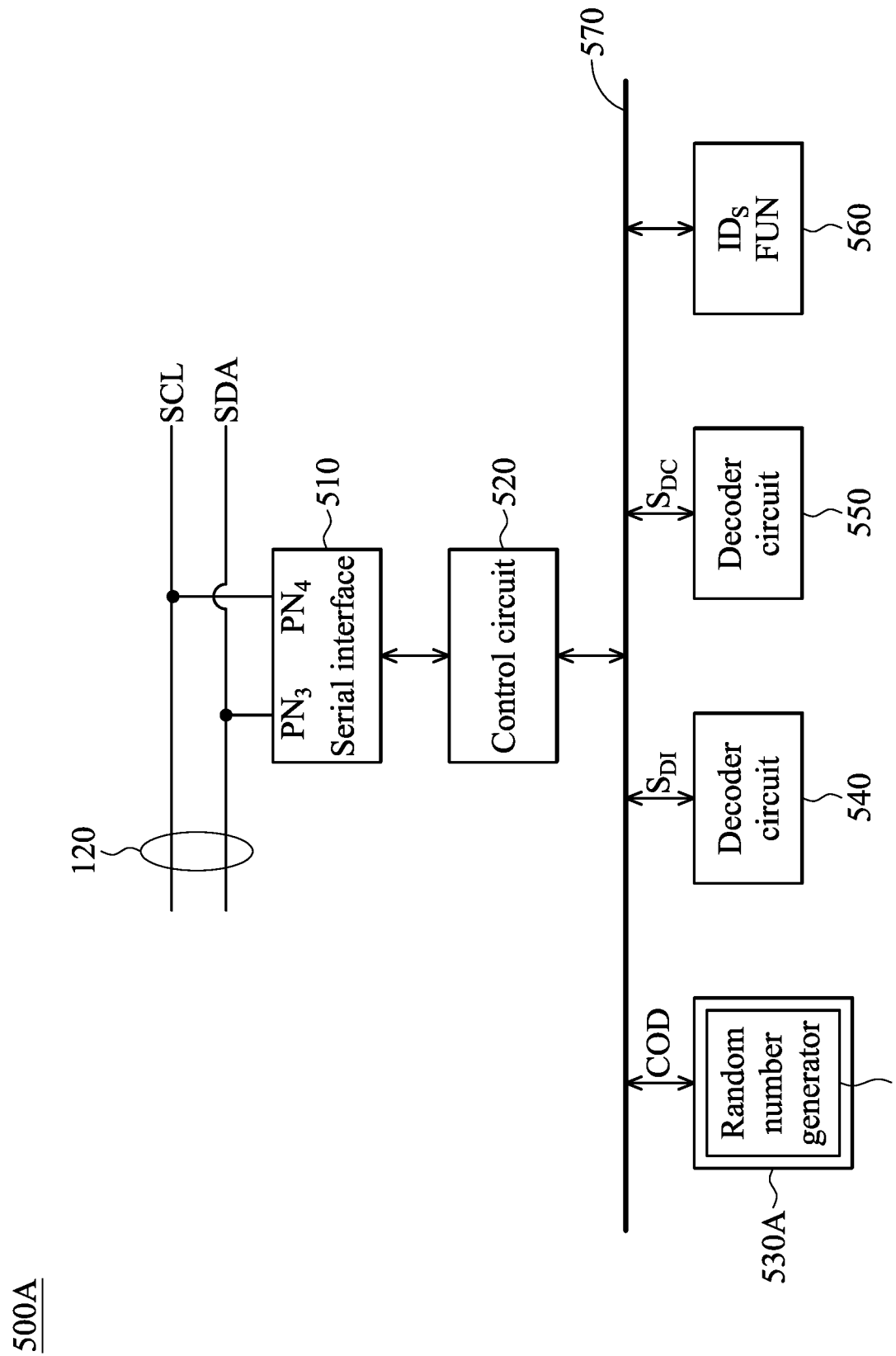
FIG. 5A is a schematic diagram of an exemplary embodiment of a slave device according to various aspects of the present disclosure.

FIG. 5A is a schematic diagram of an exemplary embodiment of a slave device according to various aspects of the present disclosure. The slave device 500A is coupled to the bus 120 and coupled to a master device (e.g., 110). In this embodiment, the slave device 500A comprises a serial interface 510, a control circuit 520 and a code generator circuit 530A.

The serial interface 510 is configured to be coupled to the bus 120. The type of serial interface 510 is not limited in the present disclosure. In this embodiment, the serial interface 510 is a I2C interface and comprises pins $PN_3$ and $PN_4$. The pin $PN_3$ is configured to be coupled to the transmission line SDA. The pin $PN_4$ is configured to be coupled to the transmission line SCL.

The control circuit 520 is coupled between the serial interface 510 and the code generator circuit 530A. The structure of the code generator circuit 530A is not limited in the present disclosure. In this embodiment, the code generator circuit 530A is a random number generator 531. When the master device 110 sends a trigger command, the control circuit 520 enters a set mode. In the set mode, the control circuit 520 triggers the random number generator 531 to generate a unique code COD.

In an operation mode, the control circuit 520 determines whether to perform the command provided from the master device 110 according to the unique code COD. For example, when the value of the identification field of the command provided from the master device 110 matches the unique code COD, the control circuit 520 performs the command provided from the master device 110. When the value of the identification field of the command provided from the master device 110 is not equal to the unique code COD, the control circuit 520 does not perform the command provided from the master device 110.

In another embodiment, when the master device 110 sends a scanning command, the control circuit 520 enters a scanning mode. In this mode, the control circuit 520 receives the scanning code transmitted by the transmission line SDA via the serial interface 510 and determines whether the scanning code matches the unique code COD. When a specific scanning code matches the unique code COD, the control circuit 520 sets the level of the pin $PN_3$ of the serial interface 510 to a predetermined level, such as a low level. However, when the specific scanning code does not match the unique code COD, the control circuit 520 does not set the level of the pin $PN_3$ to the predetermined level. At this time, the level of the pin $PN_3$ may be a high level. In this case, the master device 110 recognizes that the specific scanning code matches the unique code COD according to the level of the transmission line SDA so that the master device 110 can store the specific scanning code.

In one embodiment, the master device 110 directly serves the stored specific scanning code as an identification code of the slave device 500A. In this case, when the value of the identification field of the command output from the master device 110 matches the identification code of the slave device 500A, the slave device 500A performs the command output from the master device 110.

In another embodiment, after obtaining the unique code COD of the slave device 500A, the master device 110 may assign a unique identification code $ID_S$ to the slave device 500A. In this case, the slave device 500A stores the identification code $ID_S$ provided by the master device 110. When the value of the identification field of the command sent by the master device 110 matches the identification code $ID_S$, the slave device 500A performs the command sent by the master device 110.

In some embodiment, the slave device 500A further comprises a storage circuit 560. The storage circuit 560 is configured to store the identification code $ID_S$ assigned by the master device 110 or the unique code COD. In other embodiments, the storage circuit 560 further stores function data FUN. The function data FUN indicates the characteristic and the type pf slave device 500A. In this case, when the master device 110 sends an inquiry command and the value of the identification field of the inquiry command matches the identification code $ID_S$ or the unique code COD stored in the storage circuit 560, the control circuit 520 outputs the function data FUN to the master device 110. The master device 110 obtains the type of the slave device 500A, such as a ADC, a sensor, a DAC or a memory, according to the function data FUN. Additionally, the master device 110 may send a control command to activate a light-emitting diode of the slave device 500A according to the function data FUN. In another embodiment, the master device 110 may trigger a motor via the slave device 500A.

In other embodiments, the slave device 500A further comprises decoder circuits 540 and 550. The decoder circuit 550 decodes the command sent by the master device 110 to generate a decoded result $S_{DC}$. The control circuit 520 determines the type of the command according to the decoded result $S_{DC}$. For example, when the control circuit 520 learns that the master device 110 sends a trigger command according to the decoded result $S_{DC}$, the control circuit 520 triggers the random number generator 531 to generate a unique code COD. In one embodiment, the decoder circuit 550 is a command interpreter.

The decoder circuit 540 decodes the value of the identification field of the command sent by the master device 110 to generate a decoded result $S_{D1}$. The control circuit 520 determines whether to perform the command sent by the master device 110 according to the decoded result $S_{D1}$. For example, when the decoded result $S_{D1}$ matches the unique code COD, the control circuit 520 performs the command sent by the master device 110. When the decoded result $S_{D1}$ is not equal to the unique code COD, the control circuit 520 ignores the command sent by the master device 110.

In other embodiments, when the control circuit 520 learns that the master device 110 sends a scanning command according to the decoded result $S_{DC}$, the control circuit 520 determines whether the scanning code provided by the master device 110 matches the unique code COD. Assume that the decoded result $S_{D1}$ generated by the decoder circuit 540 represents the scanning code provided by the master device 110. In this case, when the decoded result $S_{D1}$ matches the unique code COD, it means that the scanning code provided by the master device 110 matches the unique code COD. Therefore, the control circuit 520 sets the level of the pin $PN_3$ to ta predetermined level. However, when the decoded result $S_{D1}$ is not equal to the unique code COD, it means that the scanning code provided by the master device 110 is not equal to the unique code COD. Therefore, the control circuit 520 does not set the level of the pin $PN_3$. In one embodiment, the decoder circuit 540 is an ID/Address decoder.

In some embodiments, the slave device 500A further comprises a bus 570. The control circuit 520 communicates with the code generator circuit 530A, the decoder circuits 540 and 550, and the storage circuit 560 via the bus 570. In one embodiment, the control circuit 520 generates corresponding control signals and timing sequences to control and communicate the code generator circuit 530A, the decoder circuits 540 and 550, and the storage circuit 560. The type of bus 570 is not limited in the present disclosure. The bus 570 may utilize a serial method or a parallel method to transmit data (e.g., COD, $S_{D1}$, $S_{DC}$, $ID_S$, and FUN).

Figure 5B:
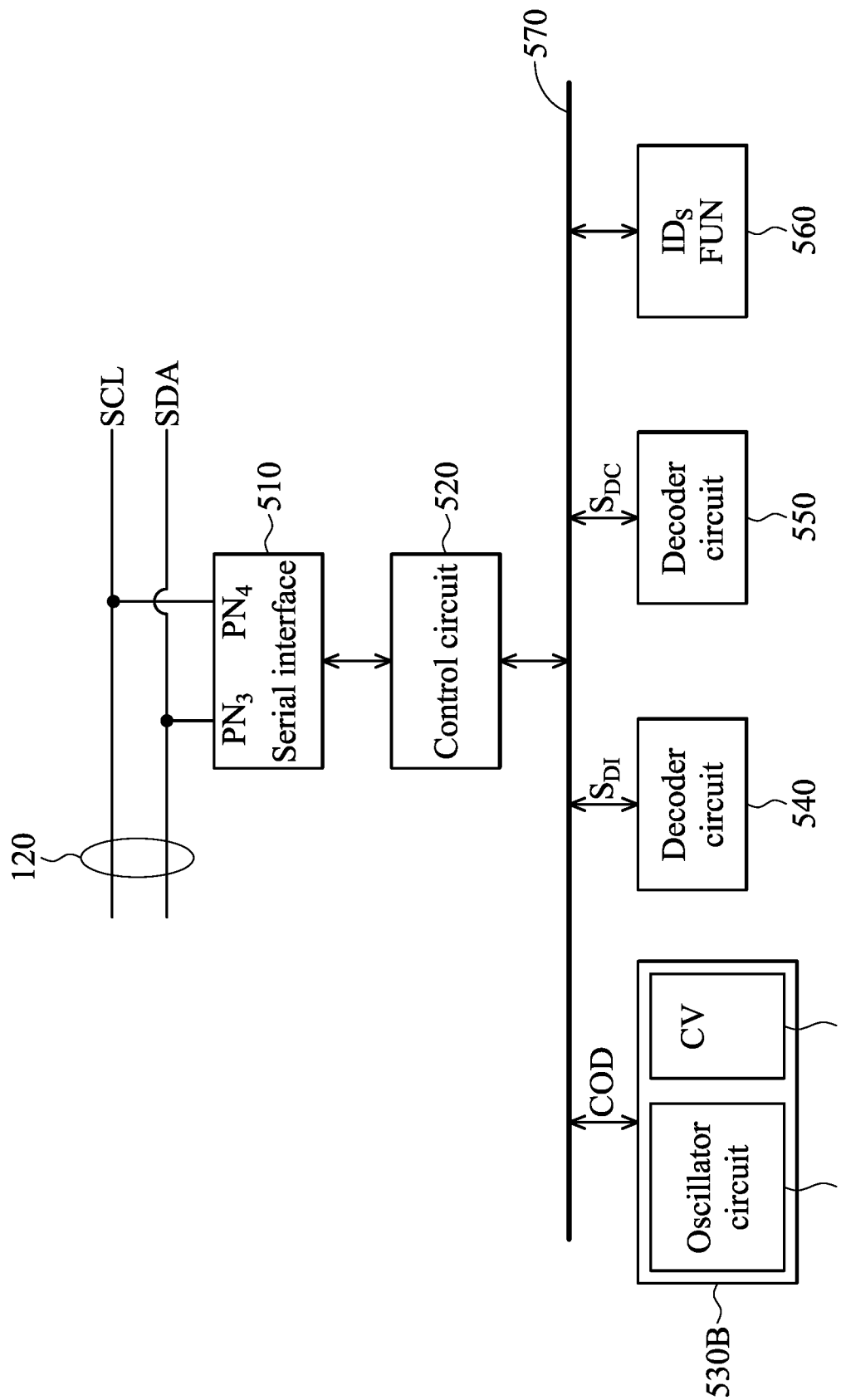
FIG. 5B is a schematic diagram of another exemplary embodiment of the slave device according to various aspects of the present disclosure.

FIG. 5B is a schematic diagram of another exemplary embodiment of the slave device according to various aspects of the present disclosure. FIG. 5B is similar to FIG. 5A with the exception that the code generator circuit 530B of FIG. 5B comprises an oscillator circuit 532 and a counter circuit 533. The oscillator circuit 532 is configured to generate a plurality of pulses. When the slave device 500B is boosted, the oscillator circuit 532 starts generating pulses. The frequency of the pulse generated by the oscillator circuit 532 is not limited in the present disclosure. In one embodiment, the frequency of the pulses generated by the oscillator circuit of one slave device is different from the frequency of the pulses generated by the oscillator circuit of another slave device. In some embodiment, the oscillator circuit 532 may be independent of the slave device 500B.

In other embodiments, the oscillator circuit 532 can be omitted. In this case, the counter circuit 533 counts the pulses generated by the oscillator circuit (not shown) in other elements, such as the decoder circuits 540 and 550 or the storage circuit 560. Since the code generator circuit 530B and other circuits share a single oscillator circuit, the cost of the elements can be reduced. In some embodiments, the pulses generated by the oscillator circuit 532 can be used by the decoder circuits 540 and 550, and the storage circuit 560 or used by other elements (not shown) of the slave device 500B.

The counter circuit 533 counts the number of pulses generated by the oscillator circuit 532 to generate a count value CV. When the control circuit 520 obtains that the master device 110 sends a start-counting command according to the decoded result $S_{DC}$, the control circuit 520 resets the count value CV and activates the counter circuit 533 so that the counter circuit 533 can adjust the count value CV according to the number of pulses generated by the oscillator circuit 532. When the control circuit 520 obtains that the master device 110 sends a stop-counting command according to the decoded result $S_{DC}$, the control circuit 520 does not activate the counter circuit 533 so that the counter circuit 533 stops counting the pulses generated by the oscillator circuit 532 and maintains the count value CV. At this time, the count value is provided as a unique code COD.

Figure 6A:
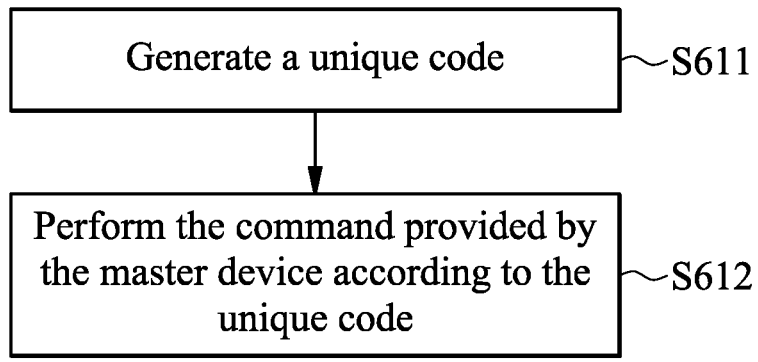
FIG. 6A is a flowchart schematic diagram of an exemplary embodiment of a data transmission method for the slave device according to various aspects of the present disclosure.

FIG. 6A is a flowchart schematic diagram of an exemplary embodiment of a data transmission method for the slave device according to various aspects of the present disclosure. The data transmission method of FIG. 6 can be executed by a slave device of a master-slave system, such as the slave device 500A shown in FIG. 5A or the slave device 500B shown in FIG. 5B. First, a unique code is generated (step S611). In the present disclosure, there is no limitation to the generation of the unique code. In one embodiment, the slave device comprises a random number generator. When the master device sends a trigger command, the random number generator generates a random number served as a unique code.

Next, the slave device determines whether to perform the command provided by the master device according to the unique code (step S612). For example, when the value of the identification field of the command sent by the master device is not equal to the unique code COD, the slave device does not perform the command provided by the master device. When the value of the identification field of the command provided by the master device matches the unique code, the slave device performs the command provided by the master device.

In some embodiments, when the master device sends an inquiry command and the value of the identification field of the inquiry command is the same as the unique code, the slave device provides function data to the master device. In this case, the master device obtains the function of the slave device according to the function data provided by the slave device. In other embodiment, the master device assigns an identification code to a slave device according to the function data provided by the slave device to replace the unique code of the slave device. In this case, the identification code assigned by the master device is stored in the slave device.

Figure 6B:
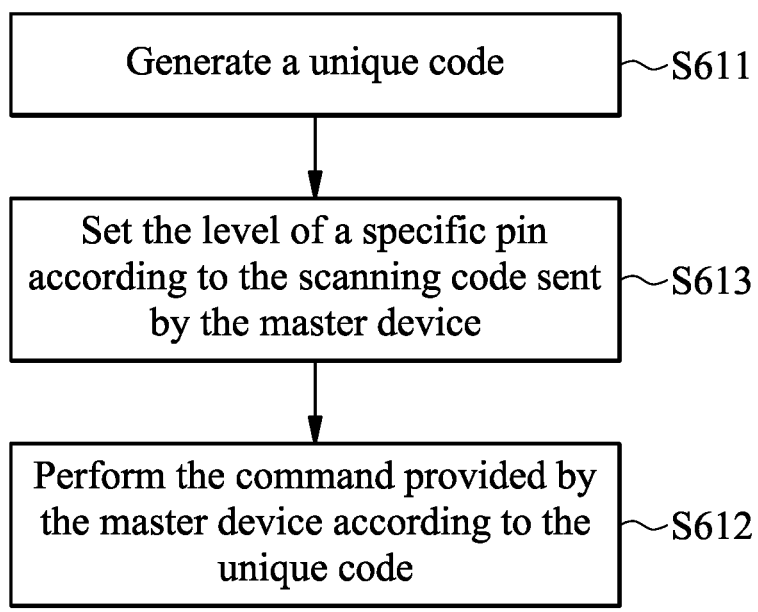
FIG. 6B is a flowchart schematic diagram of another exemplary embodiment of the data transmission method for the slave device according to various aspects of the present disclosure.

FIG. 6B is a flowchart schematic diagram of another exemplary embodiment of the data transmission method for the slave device according to various aspects of the present disclosure. FIG. 6B is similar to FIG. 6A except for the addition of step S613. Step S613 sets the level of a specific pin according to the scanning code sent by the master device. For example, when the master device sends a scanning command, the slave device determines whether a scanning code output by the master device matches the unique code of the slave device. When the scanning code matches the unique code, the slave device sets the level of a specific pin of a serial interface to a predetermined level, such as a low level. In this case, the specific pin is configured to receive scanning commands and the scanning codes.

In one embodiment, the scanning code is combined in the scanning command. For example, the value of an identification field of the scanning command is provided as a scanning code. In another embodiment, the master device first outputs a scanning command and outputs a scanning code.

In some embodiments, the master device determines whether to store the scanning code according to the level of the specific pin. For example, when the master device outputs a first scanning code, if the slave device sets the level of the specific pin to the predetermined level, it means that the first scanning code matches the unique code of the slave device. Therefore, the master device stores a first scanning code and utilizes the first scanning code to control the corresponding slave device.

In some embodiments, the master device may assign different identification codes to different slave devices according to the stored scanning codes. In this case, each of the slave devices stores an identification code assigned by the master device and determines whether to perform the command sent by the master device according to the assigned identification code.

Figure 7:
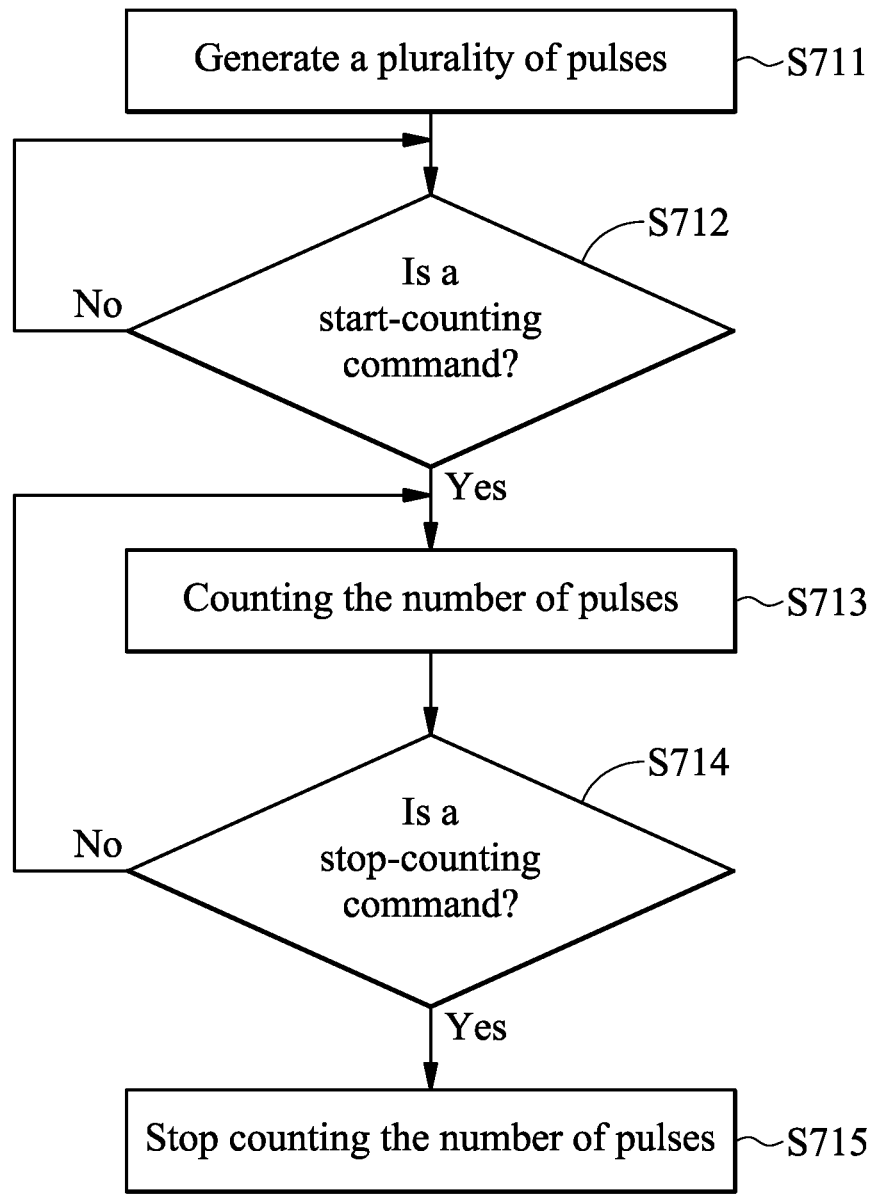
FIG. 7 is a flowchart schematic diagram of an exemplary embodiment of step S611 of FIG. 6A according to various aspects of the present disclosure.

FIG. 7 is a flowchart schematic diagram of an exemplary embodiment of step S611 of FIG. 6A according to various aspects of the present disclosure. First, a plurality of pulses are generated (step S711). Then, a determination is made as to whether the master device sends a start-counting command (step S712). When the master device 110 sends the start-counting command, a count value is reset and the number of pulses is counted to adjust the count value (step S713).

Next, a determination is made as to whether the master device sends a stop-counting command (step S714). When the master device sends the stop-counting command, stop counting the number of pulses and the count value is provided as a unique code (step S715). However, when the master device does not send the stop-counting command, step S713 is performed to count the number of pulses.

The slave device generates its own unique code so that there is no need to write an identification code in the slave device in advance. Additionally, since the elements in the slave device have different delay time, the probability of different slave devices having the same unique code is very low. Furthermore, the original counting circuit and/or the original oscillation circuits in the slave device are utilized to generate a unique code so that the cost of elements is reduced.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a master device or a slave device for practicing the methods. The data transmission methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes a master device or a slave device for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A master device coupled to a plurality of slave devices via a bus, comprising:
   a serial interface configured to be coupled to the bus;
   a scanning circuit configured to generate a plurality of scanning codes; and
   a control circuit controlling the slave devices via the serial interface,
   wherein:
   in a set mode, the control circuit directs each of the slave devices to generate a unique code via the serial interface; and
   in a scanning mode, the control circuit outputs the plurality of scanning codes to the slave devices to obtain the unique codes of the slave devices via the serial interface,
   in response to one of the scanning codes matching the unique code of a corresponding slave device, the corresponding slave device sets a level of a transmission line of the bus equal to a predetermined level,
   in response to the level of the transmission line of the bus being equal to the predetermined level, the control circuit stores the scanning code which matches the unique code of the corresponding slave device,
   the control circuit provides a control command to one of the slave devices, and a value of an identification field of the control command matches one of the stored scanning codes.

2. The master device as claimed in claim 1, further comprising:
   a command generator circuit configured to generate a start-counting command and a stop-counting command;
   wherein:
   in the set mode, the control circuit outputs the start-counting command to the slave devices via the serial interface so that a counter in each slave device starts to perform a counting operation, and after outputting the start-counting command, the control circuit waits a predetermined time and then outputs the stop-counting command to the slave devices via the serial interface to direct the counters in the slave devices to stop performing the counting operation; and
   in the scanning mode, the control circuit stores a portion of the scanning codes according to acknowledgments from the slave devices.

3. The master device as claimed in claim 2, wherein:
the control circuit outputs the scanning codes via a specific pin of the serial interface, and
in response to the control circuit outputting one of the scanning codes, the control circuit determines whether to store the output scanning code according to a level of the specific pin of the serial interface, and
the specific pin is coupled to the transmission line.

4. The master device as claimed in claim 1, wherein the control circuit uses the stored scanning codes as identification codes for the slave devices.

5. The master device as claimed in claim 1, wherein the control circuit assigns a plurality of identification codes to the slave devices according to the stored scanning codes, and each of the slave devices stores one corresponding identification code.

6. The master device as claimed in claim 1, wherein in response to the number of stored scanning codes not being equal to the number of slave devices, the control circuit enters the set mode again to direct each of the slave devices to perform the counting operation again, and in response to the control circuit entering the set mode again, the control circuit adjusts the predetermined time.

7. A data transmission method for a master device of a master-slave system, wherein the master-slave system comprises a plurality of slave devices, comprising:
directing each of the plurality of slave devices to generate a unique code;
generating a plurality of scanning codes;
outputting the plurality of scanning codes to the slave devices via a bus to obtain the unique codes of each of the slave devices;
detecting whether a level of a transmission line of the bus is equal to a predetermined level in response to one of the scanning codes having output;
storing the output scanning code in response to the level of the transmission line of the bus being equal to the predetermined level; and
assigning commands to each of the slave devices according to the unique codes of the slave devices,
wherein:
in response to one of the scanning codes matching the unique code of a corresponding slave device, the corresponding slave device sets the level of the transmission line equal to the predetermined level,
a value of an identification field of each assigned command matches one of the stored scanning codes.

8. The data transmission method as claimed in claim 7, wherein the step of directing each of the slave devices to generate a unique code comprises:
generating a start-counting command;
providing the start-counting command to the slave devices so that a counter in each of the slave devices starts performing a counting operation;
waiting a predetermined time;
generating a stop-counting command; and
providing the stop-counting command to the slave devices to direct each of the counters to stop performing the counting operation,
wherein a count value of the counter in each of the slave devices serves as the unique code of the corresponding slave device.

9. The data transmission method as claimed in claim 7, wherein the transmission line of the bus is configured to output the scanning codes.

10. The data transmission method as claimed in claim 9, further comprising:
using the stored scanning codes as identification codes for the slave devices.

11. The data transmission method as claimed in claim 9, further comprising:
assigning a plurality of identification codes to the slave devices, wherein each of the slave devices stores one of the identification codes.

12. The data transmission method as claimed in claim 9, further comprising:
determining whether the number of stored scanning codes is not equal to the number of slave devices;
directing each of the slave devices to perform the counting operation again in response to the number of stored scanning codes not being equal to the number of slave devices; and
adjusting the predetermined time in response to each of the slave devices performing the counting operation again.

13. The data transmission method as claimed in claim 8, further comprising:
generating a clock signal; and
providing the clock signal to the slave devices,
wherein each of the slave devices receives the start-counting command and the stop-counting command according to the clock signal.

14. A slave device coupled to a master device via a bus, comprising:
a serial interface configured to be coupled to the bus;
a code generator circuit configured to generate a unique code; and
a control circuit coupled between the serial interface and the code generator circuit,
wherein:
in a set mode, the control circuit triggers the code generator circuit to generate the unique code,
in an operation mode, the control circuit determines whether to perform commands provided by the master device according to the unique code, and
in response to the master device sending a trigger command, the control circuit enters the set mode to trigger the code generator circuit,
in response to the control circuit receiving a scanning code via a transmission line of the bus, the control circuit determines whether the scanning code matches the unique code, and
in response to the scanning code matching the unique code, the control circuit sets the level of the transmission line to a predetermined level.

15. The slave device as claimed in claim 14, further comprising:
a first decoder circuit decoding the commands provided by the master device to determine whether the master device has sent a start-counting command and a stop-counting command.

16. The slave device as claimed in claim 15, wherein the code generator circuit comprises:
an oscillation circuit configured to generate a plurality of pulses; and
a counter circuit counting the number of pulses to generate a count value,
wherein:
the count value is used as the unique code,
in response to the master device sending the start-counting command, the control circuit resets the count value and enables the counter circuit so that the counter circuit adjusts the count value according to the number of pulses, and in response to the master device sending the stop-counting command, the control circuit does not enable the counter circuit so that the counter circuit stops counting the number of pulses and maintains the count value.

17. The slave device as claimed in claim 14, wherein:

in response to the master device sending a scanning command, the control circuit determines whether the scanning code matches the unique code, the scanning code is provided by the master device, and in response to the scanning code being equal to the unique code, the control circuit sets the level of a specific pin of the serial interface to the predetermined level, and in response to the scanning code not being equal to the unique code, the control circuit does not set the level of the specific pin, the specific pin is coupled to the transmission line of the bus.

18. The slave device as claimed in claim 14, further comprising:

a second decoder circuit decoding a value of an identification field of a command sent by the master device, wherein in response to the value of the identification field being equal to the unique code, the second decoder circuit informs the control circuit so that the control circuit performs the command sent by the master device.

19. The slave device as claimed in claim 14, wherein the control circuit stores an identification code in a storage circuit, and the identification code is provided by the master device.

20. The slave device as claimed in claim 19, wherein the storage circuit further stores function data, in response to the master device sending an inquiry command and a value of an identification field of the inquiry command being equal to the identification code, the control circuit outputs the function data to the master device.

21. The master device as claimed in claim 1, wherein in response to the number of stored scanning codes stored in the control circuit not being equal to the number of slave devices, the control circuit directs the slave devices to regenerate new unique codes.

22. The data transmission method as claimed in claim 6, further comprising:

determining whether the number of stored scanning codes is not equal to the number of slave devices;

directing each of the slave devices to regenerate the unique code in response to the number of stored scanning codes not being equal to the number of slave devices; and re-outputting the scanning codes to the slave devices.

23. The slave device as claimed in claim 14, wherein in response to the master device sending a trigger command, the control circuit reenters the set mode so that the code generator circuit changes the unique code.

\* \* \* \* \*